United States Patent [19]
Yang

[11] Patent Number: 5,098,110
[45] Date of Patent: Mar. 24, 1992

[54] METHOD FOR REMOTELY CONTROLLING A VIDEO GAME SYSTEM OF A VIDEO GAME APPARATUS

[76] Inventor: Michael Yang, 4 Fl., No. 28, Lane 42, Tung Kuang Rd., Hsin Chu City, Taiwan, Taiwan

[21] Appl. No.: 549,277

[22] Filed: Jul. 6, 1990

Related U.S. Application Data

[63] Continuation-in-part of Ser. No. 382,720, Jul. 19, 1989, abandoned.

[51] Int. Cl.$^5$ .............................................. A63F 9/22
[52] U.S. Cl. ................................. 273/438; 273/148 B; 340/709
[58] Field of Search ................... 273/148 B, DIG. 28, 273/85 G, 434, 438; 340/706, 709, 711, 825.71, 825.72, 825.73, 825.74

[56] References Cited

U.S. PATENT DOCUMENTS

| | | | |
|---|---|---|---|
| 3,676,939 | 7/1972 | Oberst et al. .................... | 434/351 |
| 4,111,421 | 9/1978 | Mierzwinski .................... | 273/85 G |
| 4,313,227 | 1/1982 | Eder ................................ | 340/709 |
| 4,840,602 | 6/1989 | Rose ................................ | 273/1 E |
| 4,844,475 | 7/1989 | Saffer et al. .................... | 273/311 |
| 4,924,216 | 5/1990 | Leung ............................. | 340/709 |

FOREIGN PATENT DOCUMENTS

| | | | |
|---|---|---|---|
| 2057174 | 3/1981 | United Kingdom ............. | 273/D28 |
| 2211705 | 7/1989 | United Kingdom ............. | 273/148 B |

Primary Examiner—William H. Grieb
Assistant Examiner—Jessica Harrison
Attorney, Agent, or Firm—Poms, Smith, Lande & Rose

[57] ABSTRACT

A method for remotely controlling a video game apparatus with two player systems for two rival players, in which the information transmitted by a first and a second transmitter are modulated by the same carrier frequency fc and transmitted to a receiver of the video game apparatus. The transmission of both transmitters are periodical groups of transmission cycles in which information is incorporated. In order to identify the source of each of the received transmission cycles, a transmitter-identifying code is incorporated in each transmission cycle. A transmission cycle is taken as invalid and rejected by the receiver if its span is overlapped by the span of any transmission cycle of the other transmitter, and is only taken as valid and accepted by the receiver, if its span is not overlapped by the span of any transmission cycle of the other transmitter. The distribution of transmission cycles in the transmission of both transmitters are such that in each period Tp there is at least valid transmission cycle despite the phase difference of the transmission of the two transmitters. To achieve this object, a period $T_p$ of transmisison is divided into eight intervals, T. T is slightly greater than a transmission cycle T1, thus leaving a gap T2 between two adjacent transmission cycles. The distribution of transmission cycles (represented by 1) and blank intervals (represented by 0) in each period is 11001110 for the first player system, and 11110000 for the second player system.

2 Claims, 7 Drawing Sheets

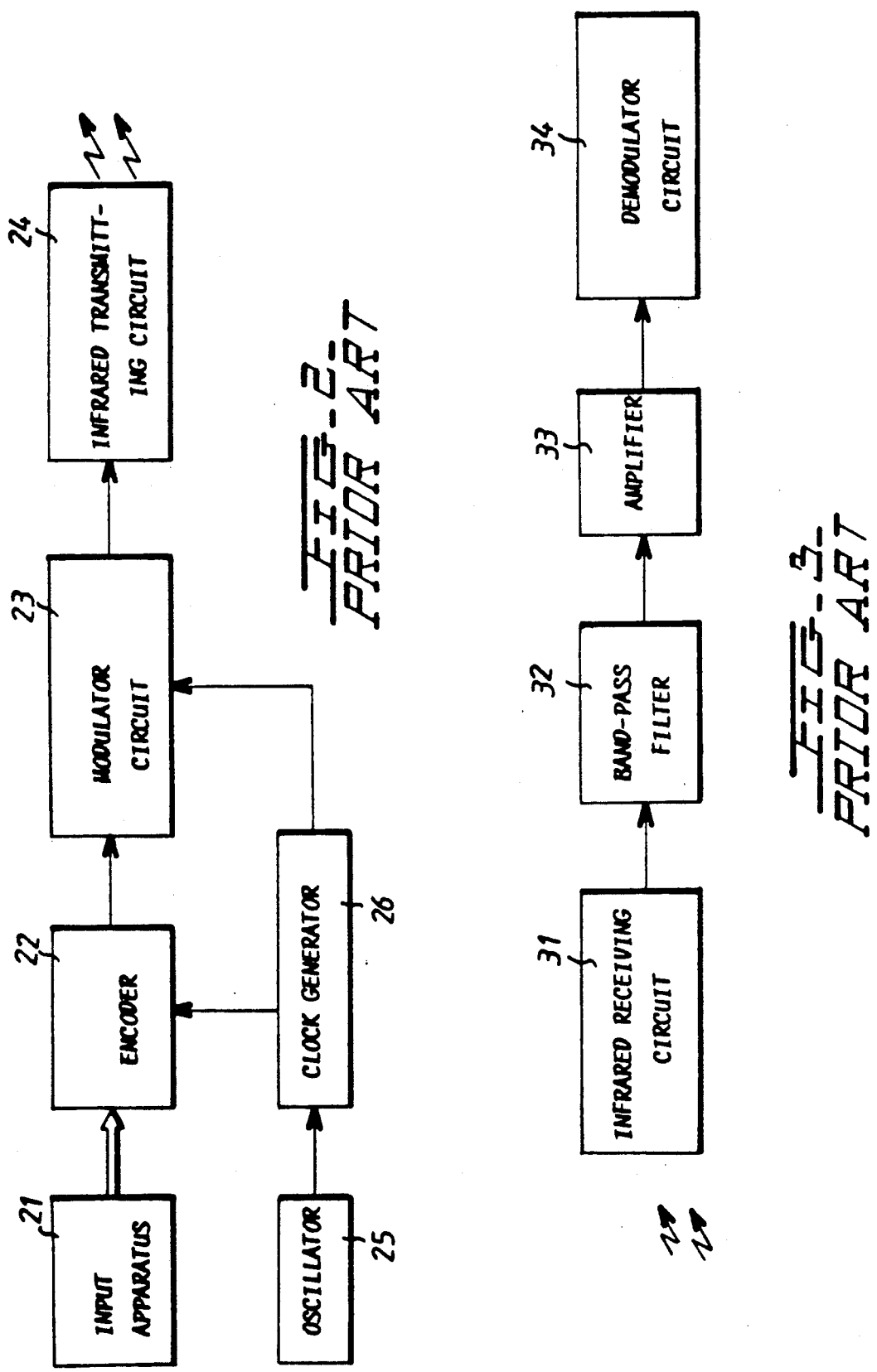

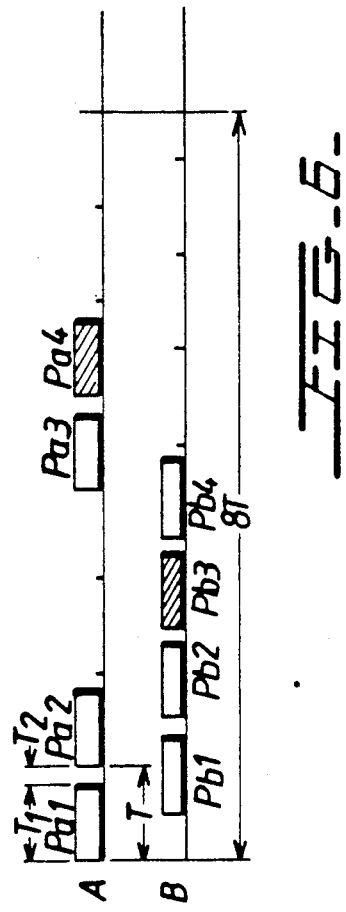

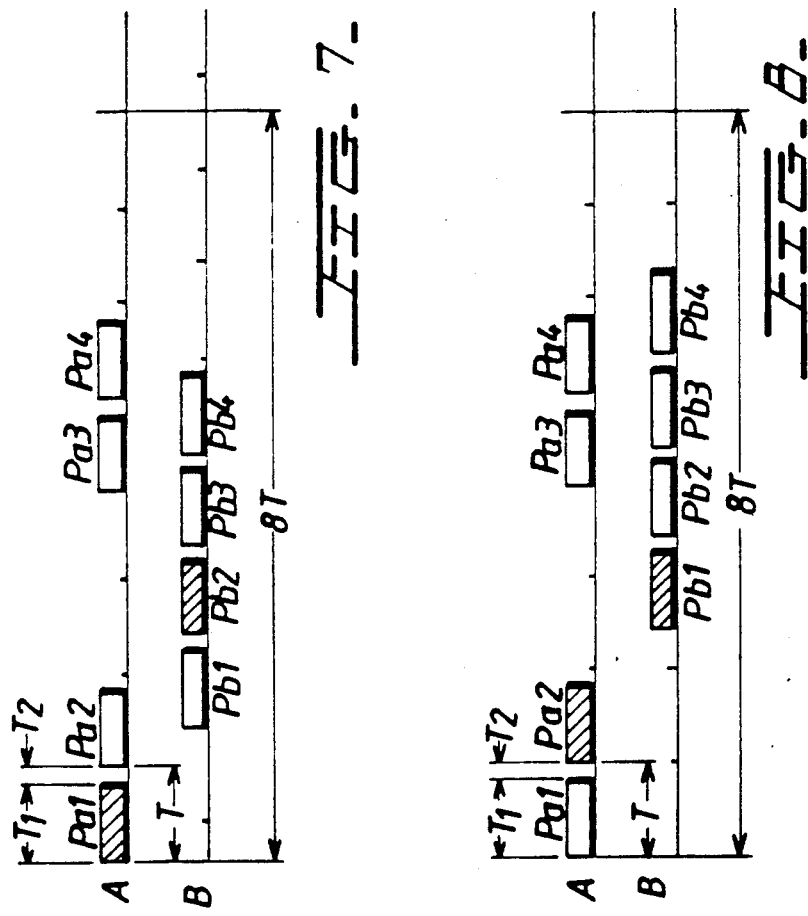

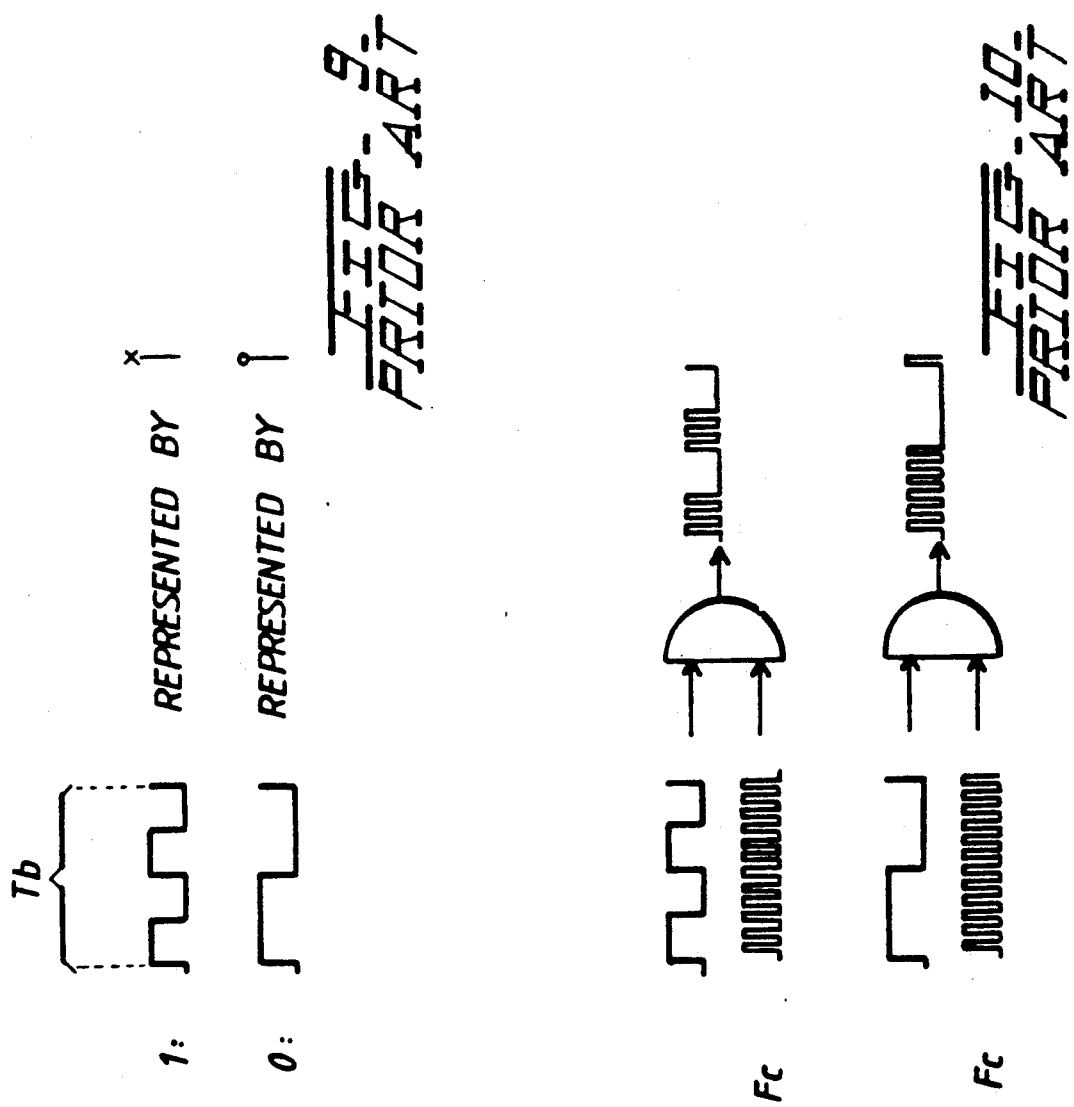

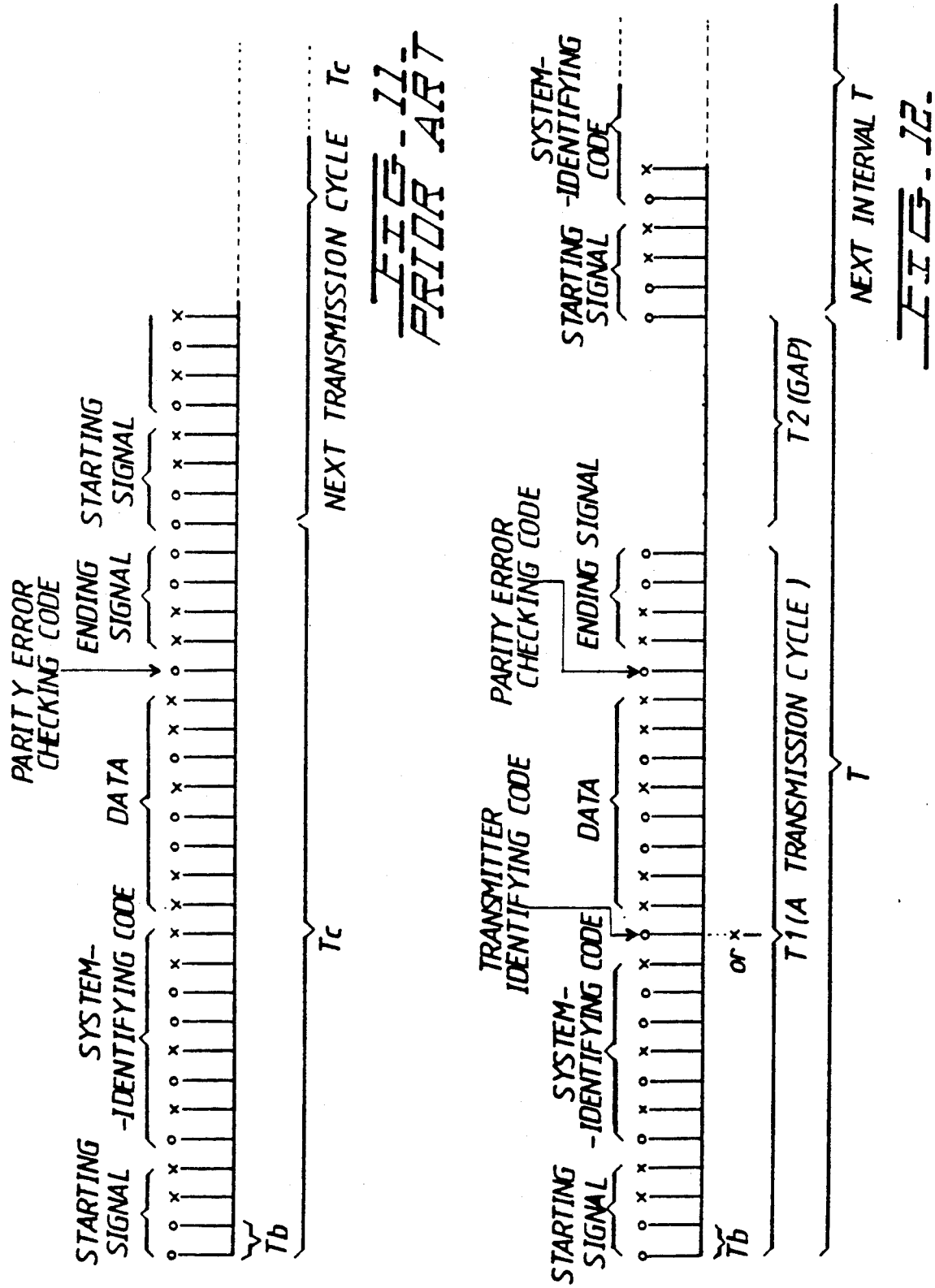

METHOD FOR REMOTELY CONTROLLING A VIDEO GAME SYSTEM OF A VIDEO GAME APPARATUS

This application is a continuation in part of U.S. Patent Application Ser. No. 07/382,720, filed July 19, 1989, now abandoned.

BACKGROUND OF THE INVENTION

The present invention relates to a method for remotely controlling a video game apparatus with two player systems for two rival players. More particularly, the present invention relates to a method in which the signals transmitted by two transmitters are modulated the same carrier frequency, and the reception of the respective signals from the different transmitters by a receiver need not be synchronous. The received signals, after demodulated and decoded, are identified by the receiver so that the latter can know which of the two transmitters transmits the signals and send the received signals to the corresponding player systems of the video game apparatus.

In a conventional two-channel video game remote controlling system for a video game played by two rival players, like the one shown in FIG. 1, a first and a second infrared transmitter 11 and 15 are provided to send infrared signals respectively to a first and a second receiver 12 and 16 which respectively control a first and a second player system (not shown) in the video game apparatus. The infrared signals are decoded by respective decoders 13 and 17 and sent respectively into the first and second player systems of a video game apparatus. As can be seen in FIG. 2, the first or second transmitter 11 or 15 comprises an input apparatus 21, and encoder 22, a modulator circuit 23, an infrared transmitting circuit 24, an oscillator 25 and a clock generator 26. The encoder receives the data input from the input apparatus 21 which can be a keyboard or a joy-stick, and converts the data into a binary code in form of serial bits (for example, 8 bits). In order to transmit the data, this code is modulated in the modulator circuit 23 by a carrier frequency fc (for example, in the range from 32 KHz to 64 KHz) and transmitted by the infrared transmitting circuit 24.

In conventional method of transmission, for example, pulse frequency modulation (PFM), the different bits 0 and 1 are respectively represented by pulses of different band width. Referring to FIG. 9, in a time duration Tb for transmitting a bit, if there are two narrow pulses, the bit is 1, and if there is only a single broad pulse, the bit is 0. The waveform of the bits 1 and 0 are represented in FIGS. 11 and 12 as an X-stem or an O-stem to facilitate the reading of the contents in the transmission cycle.

All the signals or data to be transmitted (including a starting signal, a system-identifying code, the data from the input apparatus 21, a parity error checking code, and an ending signal) in a transmission cycle Tc are encoded by the encoder 22 and modulated by the modulator circuit 23 into modulated codes. FIG. 11 shows how a bit 0 or 1 is modulated by an oscillating frequency fc. The modulated codes are then transmitted by the infrared transmitting circuit 24 having an infrared LED which blinks in accordance with the modulated codes. Thus the codes are transmitted by the emitted infrared ray from the infrared LED with a carrier frequency fc. [Note: the carrier frequency fc is not the inherent frequency of the infrared rays emitted by the infrared LED of which the spectrum is of the order of GHz, but the "blinking frequency" thereof due to the oscillation frequency fc.]

Referring to FIG. 11, the transmission comprises consecutive transmission cycles Tc, one followed by another without a vacant gap between two adjacent transmission cycles. In other words, the whole transmission cycle is occupied by transmittants (here the term "transmittant" means the all signals or codes to be transmitted, including for example a four-bit starting signal, an eight-bit system-identifying code, an eight-bit data, a one-bit parity error checking code and a-four-bit ending signal. In so far as the player keeps on inputting data, the transmission cycles will be continuously repeated without a pause.

When the transmittants of a transmission cycle Tc is received by a receiver (for example, receiver 12), the receiver 12 will judge if the transmission comes from the first transmitter 11. If this is the case, the transmittant will be received and demodulated. Then from the starting signal, the receiver knows a transmission cycle has begun. From the transmitter-identifying code, the receiver knows whether that the transmission comes from its own system or from an alien system and responsively accepts or rejects it. If the transmission is accepted, the data code will be decoded to make corresponding control of the player system of the video game (for example, upward or downward shift of the cursor). The parity-error-checking code provides an indicator to roughly detect if the received data is distorted. From the starting signal, the receiver knows that the transmission has come to an end, and prepares for the next transmission cycle.

Each of the first and second receivers 12 and 16, shown in FIG. 3, comprises an infrared receiving circuit 31, a band-pass filter 32, an amplifier 33 and a demodulator circuit 34. The transmitted signals from the transmitters 11 and 15, after being received by the infrared receiving circuit 31, are converted into electrical signals, the signal/noise ratio (S/N ratio) of which are raised by the band-pass filter 32. After being amplified by the amplifier 33, the electrical signals are demodulated by the demodulator circuit 34 and sent to the decoders 13 and 17 shown in FIG. 1. To ensure that a receiver (for example, the first receiver) only receives the transmission from one transmitter (here the first transmitter) and not from another transmitter (the second transmitter), the two transmitters must use different carrier frequencies, for the first transmitter, $f_c = f_1$, and for the second transmitter, $f_c = f_2$.

Since the carrier frequencies $f_1$ and $f_2$ used respectively in the first and the second transmitters 11 and 15 are not of the same value, while the receivers 12 and 16 are respectively tuned to receive only one of the frequencies $f_1$ and $f_2$, the first receiver 12 can only receive the signals carried by the first carrier of frequency $f_1$ and the second receiver 16 can only receive the signals carried by the second carrier of frequency $f_2$. To ensure the two carriers to be unmistakably identified, their frequencies must not be too close, and also a well-designed band-pass filter 32 is required to prevent the overlap of the received signals with the first or the second carriers of frequencies $f_1$ or $f_2$.

For reasons of cost, square wave pulses are utilized in the transmitters, as the aforesaid PFM method suggests. If the square-wave pulses of a transmitter overlap with those of another transmitter, their separation will be difficult and will require a high cost. As stated before, the value of $f_1$ and $f_2$ must be as wide apart from each other as possible. Unfortunately, in practical use, they still have to be restricted in a narrow range, namely between 32 KHz and 64 KHz. If the carrier frequency is below 32 KHz, the data rate of the transmission will be too low and the transmission may be easily interfered by a fluorescent lamp of which the pulsation has a dominant spectrum in the range below 32 KHz. When the carrier frequency $f_1$ or $f_2$ is in the vicinity of 32 KHz, to avoid the undesired interference, the first and second transmitters must be positioned very close to the receiver. On the other hand, if the transmitted signal has a frequency above 64 KHz, both the transmitting efficiency and the sensitivity of reception are reduced.

Therefore, it is the object of this invention to provide a method for remotely controlling a video game system of a video game apparatus with a first and a second player system corresponding to respective transmitters which modulate and transmit their respective information with the same carrier frequency, for example 50 KHz, which on the one hand, is safely apart away from the 32 KHz lower limit and free from the interference by the pulsation of fluorescent lights, and on the other hand provides a sufficient transmission rate with satisfactory efficiency and sensitivity. In so doing, the necessity of two different carrier frequencies which is responsible for the high cost and low efficiency is eliminated. Moreover, since only a single frequency is needed, it can safely fall in the range of 32 KHz to 64 KHz, without that either the high frequency is above 64 KHz or the low frequency is below 32 KHz.

To use carriers of the same frequency for both transmitters, two problems must be solved:

A. The receiver must be able to identify from which source (the first transmitter or the second transmitter) the information comes, and send it to the correct player system.

B. When information from the first transmitter and that of the second transmitter overlap with each other, if the two transmitters use the same carrier frequency $f_3$, the separation of the overlapped information will be impossible using conventional method, and a severe interference will occur in both player systems.

The first problem can be easily solved by incorporating a transmitter-identifying code in each transmission cycle transmitted by the two transmitter. Practically, the transmitter-identifying code can be a one-bit code. For example, it can be "0" for the first transmitter and "1" for the second transmitter. From the transmitter-identifying code, "0" or "1", the receiver can identify that the information in a transmission cycle belong to the first transmitter or the second transmitter.

Practically, we can take out one bit from the 8-bit system-identifying code as the transmitter-identifying code, leaving only 7-bits for system identification. (See FIG. 12) For example, the transmitter-identifying bit can be 0 for the first transmitter and 1 for the second transmitter. Thus, in a transmission cycle, the receiver can identify if the transmission comes from its own system by checking the seven-bit system-identifying code, and then identify the source of the transmission (transmitter A or B) by means of the one-bit transmitter-identifying code.

To ensure a transmission cycle of a transmitter (for example A) not to be overlapped, the transmission of another (B) must contain a blank phase in each period which is longer than the duration of a transmission cycle. Since the relative phase position of the transmission of the two transmitters may shift due to their unsynchronousness, the blank phase must be no less than the duration of two transmission cycles to allow a transmission cycle to remain "valid" when shifting within a range of $\pm \frac{1}{2}$ T1 (T1 is the duration of a transmission cycle).

Theoretically, a transmission cycle can be immediately followed by another transmission cycle without leaving a gap between them. However, in practical use, a blank gap between the two adjacent transmission cycles is essential to provide an allowance for the probable error in the duration of a transmission cycle. We know that the duration of a transmission cycle may not be always accurately kept at the value T1. It can be occasionally become longer or shorter. If a transmission cycle lasts longer than T1, then its adjacent blank phase will become shorter than it normally would be. As a result, the width of the blank phase may not be broad enough to ensure at least a transmission cycle to safely fall within its span and thus become valid.

Thus a blank gap of duration T2 must be provided as an allowance to offset the likely lengthened transmission cycle.

Therefore, each period of transmission Tp may include a number of intervals T, (T=T1+T2) in which a transmission cycle is present (called "occupied intervals") or absent (called "blank intervals"). The adjacent "blank intervals" (and also the gap adjacent to them) make the necessary blank phase. Referring to FIG. 5, the transmission of transmitter A provides two such "blank phases" of a width=2T+T2, which the transmission of transmitter B provides a single "blank phase" of width=4T+T2. Here each transmission cycle of $P_{a1}$ to $P_{a4}$ and $P_{b1}$ to $P_{b4}$ is represented by a rectangle for simplicity reason.

The second problem is solved by "invalidating" (or more correctly "rejecting") all the overlapped transmission cycles and accepting only the unoverlapped ones. In other words, a transmission cycle is taken as invalid and its transmittants rejected by the receiver if its span is overlapped by the span of any transmission cycle of the other transmitter. A transmission cycle is only taken as valid and therefore its transmittants accepted by the receiver when its span is not overlapped by the span of any transmission cycle of the other transmitter. Thus, the interference due to overlapped information of both transmitters is effectively avoid.

The judgment of whether a transmission cycle is overlapped can be easily achieved by conventional technique. Likewise, the rejection of an overlapped transmission cycle and the acceptance of an unoverlapped one can also be accomplished by known means. Thus, the corresponding details are not necessary.

The invalidation of the overlapped transmission cycles must not be such that in a period no valid transmission cycle is left in the transmission of either the first transmitter or the second transmitter. If no valid transmission cycle is left in a period, a transmitter becomes functionless at this moment. Therefore, the distribution of transmission cycles of both transmitters must be such as to ensure that the transmission of any of the two transmitters has at least a valid transmission cycle in a period.

To insure at least a valid transmission cycle in a period, the conventional "time-sharing" cannot be used, since in time-sharing the two transmitters must be synchronized and therefore must be connected on-line with each others. This will make the operation of the remote controllers inconveniently awkward. Thus the distribution of transmission cycles must always ensure a valid transmission cycle in each period regardless of the phase difference of the transmission of the two. U.S. Pat. No. 4,924,216 disclosed a method for controlling a video game for two player systems using a common modulating frequency. To ensure that both player systems have at least one valid transmission cycle within a limited period, each transmission cycle is separated by an equidistant blank phase. Practically, the blank phase must be at least three times that of a transmission cycle for the first player system, and five times that of a transmission cycle for the second player system. Thus, the transmission is sparse and a major portion of the duration of transmission is occupied by blank phase. As a result, the efficiency of transmission is low and the response delay time is considerable.

This invention is directed to providing a more reasonable distribution of transmission cycles which has a high efficiency of transmission and a short delay time.

This invention will be better understood when read in connection with the accompanying drawing, in which:

BRIEF DESCRIPTION OF THE DRAWINGS

FIG. 2 is a block diagram of a conventional transmitter used in the controlling system of FIG. 1;

FIG. 3 is a block diagram of a conventional receiver used in the controlling system of FIG. 1;

FIG. 5 is a series of waveform diagrams showing the distribution of transmission cycles for the first and second transmitters;

FIGS. 6-8 illustrate the waveform diagrams of FIG. 5 but with the beginning point of a period of the first transmitter not coincident with the beginning point of a period of the second transmitter, wherein FIG. 6 shows a lag shorter than 1T, FIG. 7 shows a lag between 1T and 2T, FIG. 8 shows a lag between 2T and 3T;

FIG. 9 shows the waveform of bits 0 and 1 in a transmission time for one bit;

FIG. 10 shows the modulation of the bits in FIG. 13;

FIG. 11 shows the structure of a transmission cycle of conventional remote controlling system; and FIG. 12 shows the structure of an interval of transmission of this invention.

DETAILED DESCRIPTION OF THE PREFERRED EMBODIMENT

Figure 1:
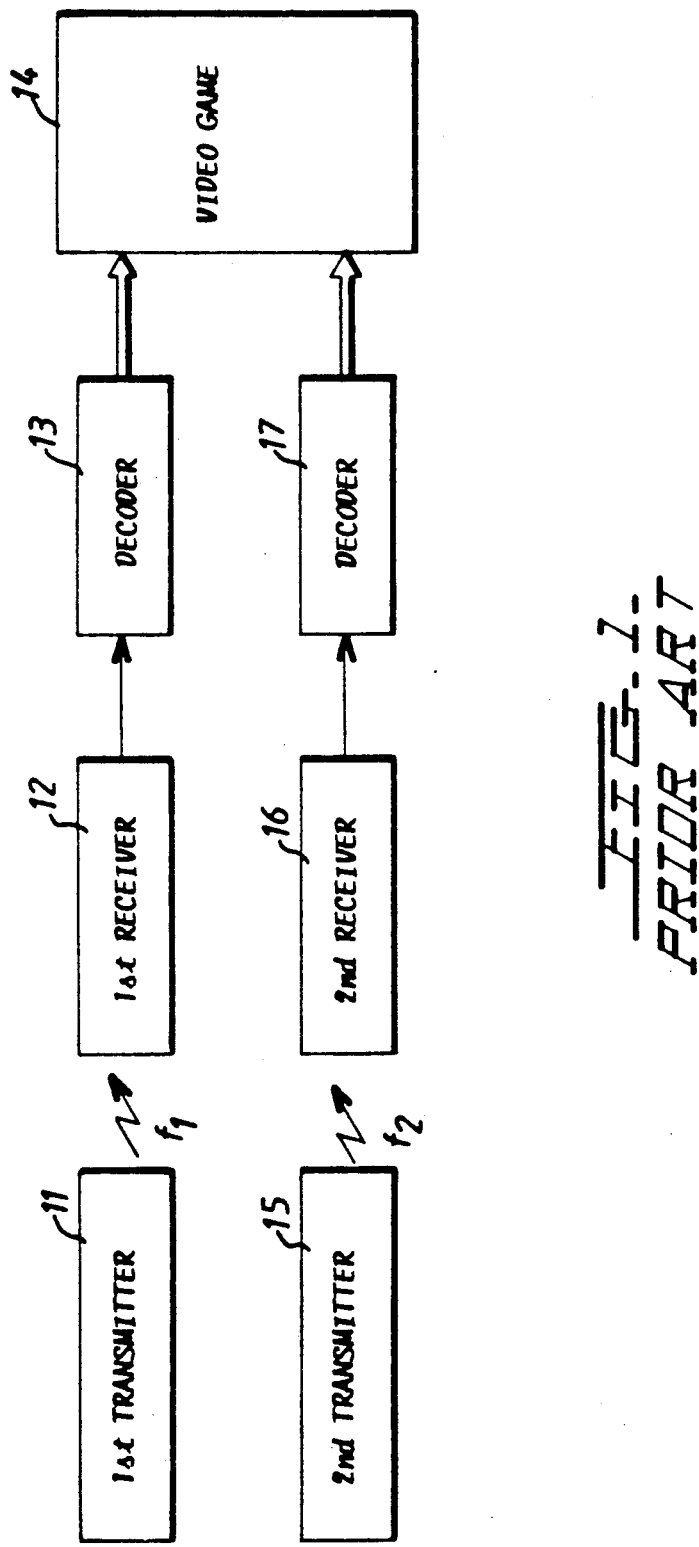
FIG. 1 is a block diagram of a conventional two channel video game remote controlling system.
Figure 4:
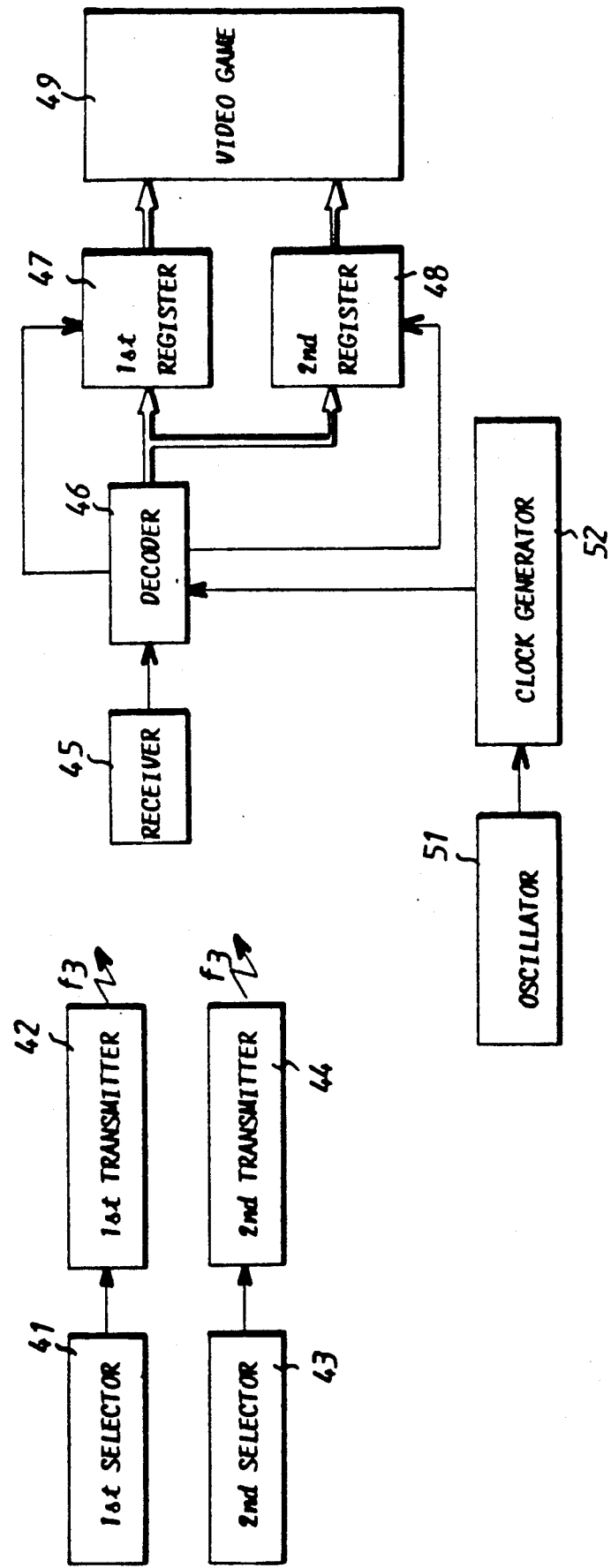
FIG. 4 is a block diagram of a two channel video game remote controlling system in accordance with the present invention.

With reference to the drawings and in particular to FIG. 4 thereof, a video game apparatus with two player systems (not shown) remotely controlled by two rival players comprises a first and a second transmitter 42 and 44, and a receiver 45, the output of which is connected to the input of a first and second player system of a video game apparatus 49 (here, a first and second register 47 and 48 are respectively provided for each system) via a decoder 46 to receive the signals transmitted by the first and second transmitters 42 and 44. A first and a second selector 41 and 43 are respectively connected to the first and second transmitters 42 and 44 to select one out of two transmitter-identifying codes which must be added in each transmission cycle so that an identification of the source of a transmission is possible. The selectors 41 and 43 can be used to select one out of the two codes "0" and "1". For example, one can use the first selector 41 to select the code "0" for the first transmitter and use the second selector 43 to select the code "1" for the second transmitter, thus the transmissions from the two transmitters can be identified. The decoder 46, the input of which is connected to the output of the receiver 45 and is actuated by an oscillator 51 and a clock generator 52, decodes the received signals and is capable of discriminating between a transmission from the first transmitter 42 and a transmission from the second transmitter 44. The decoder 46, oscillator 51 and clock generator 52 are similar to the decoders 13 and 17, oscillator 25 and clock generator 26 of the conventional system so that their detailed description is not necessary. Here, only one thing is to be noted: if the signal is identified as transmitted by the first transmitter 42, it is sent to the first register 47; alternatively, if the signal is identified as transmitted by the second transmitter 44, it is sent to the second register 48.

To eliminate the possible interference caused by the overlap of the transmission from both transmitters, while ensuring the validity thereof, FIG. 5 suggests a practical solution. As stated before, only a single carrier frequency f3 is involved in this invention in association with different waveform diagrams A and B respectively corresponding to the first and second transmitters 42 and 44. The waveform diagrams A and B of the first and second transmitters 42 and 44 of this method are stated as follows: select a period Tp as an unit time. Divide the unit time $T_p$ into eight equal intervals of duration T, $T_p = 8$ T. A single transmission cycle can be present or be absent in each interval, and if present in an interval, it begins at the beginning point of the interval. The first and second transmitter respectively send out periodical groups of transmission cycles of the same width of T1. T = T1 + T2, T2 is the blank gap following a transmission cycle in an interval. If a transmission cycle of the width T1 is transmitted by the transmitter 42 or 44 in an interval T, we use "1" to denote it; if no transmission cycle is transmitted in an interval, we use "0" to denote it. Therefore, the waveform diagram (or more accurately, pulse distribution diagram) A of the transmission cycles for the first transmitter 42 in a time unit 8T is therefore 1-1-0-0-1-1-0-0, while the waveform diagram B of the transmission cycle for the second transmitter 44 is 1-1-1-1-0-0-0-0, shown in FIG. 5.

A transmission cycle is only taken as "valid" when it is not overlapped, partially or totally, by another transmission cycle given by another transmitter. For example, the transmission cycles $P_{a1}$, $P_{a2}$ of the waveform diagram A are "invalid" because they are totally overlapped by the transmission cycles $P_{b1}$, $P_{b2}$ of the waveform diagram B, while the transmission cycles $P_{a3}$, $P_{a4}$ of the waveform diagram A not overlapped by any other transmission cycles are valid. Likewise, the transmission cycles $P_{b1}$, $P_{b2}$ of the waveform diagram B are "invalid" while transmission cycles $P_{b3}$, $P_{b4}$ of the waveform diagram B are "valid". The "valid" transmission cycles are represented by hatch lines. The distribution of the transmission cycles ensures that both the first and second transmitters to have at least one "valid" transmission cycle in each period.

The received signals are checked to see whether or not they are sent from the transmitters 42 and 44 of this invention and not from another source, by checking lead code, end code, parity code, the length of the signals, and so on. Since the technique used in checking the received signals is well-known, its detailed description is unnecessary. The transmitter-identifying code of the received signals is further checked to determine that the received signals are sent from the first or the second transmitter 42 and 44. If the signals are verified as coming from one of the two transmitters 42 and 44 and not from another foreign source, these signals will be allowed to enter the first or the second registers 47 and 48, that is, these signals are latched and sent into the video game 49. It should be noted that according to the above check, only the "valid" signals output from the first and second registers 47 and 48 can be latched and sent into the video game 49. The permission of entry of a "valid" transmission cycle and the rejection of an "invalid" transmission cycle can be easily achieved by known electronic or software techniques, so their details are not necessary.

Moreover, as shown by the waveform diagrams A and B in FIGS. 6 to 8, in each unit time 8T, each of the two transmitters 42 and 44 has at least one "valid" transmission cycle received by the receiver 45, regardless of the difference between the beginning point of transmission period of the first transmitter 42 and the beginning point of a period of the transmission of the second transmitter 44 (i.e., irrespective of the "phase difference" between the two transmitters 42 and 44). Since only the "valid" transmission cycles are accepted for control of the video game 49, while the overlapped ("invalid") transmission cycles are rejected, there is no risk of interference due to overlapped signals.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A method for remotely controlling a video game system of a video game apparatus with a first and a second player system respectively for two rival players of said video game apparatus, said video game system comprising a first transmitter for one of said rival players, a second transmitter for another of said rival players, a receiver to receive the signals transmitted from said first and second transmitters, and a decoder connected to the output of said receiver and the inputs of said first and second player systems of said video game apparatus, said decoder being capable of discriminating a transmission from said first transmitter and a transmission from said second transmitter respectively and giving corresponding outputs respectively in response to the transmission from said first and second transmitters to said first and second player systems, the transmission of said first transmitter comprising a plurality of transmission cycles of duration T1 in each of which a first transmitter-identifying code is incorporated, the transmission of said second transmitter comprising a plurality of transmission cycles of duration T1 in each of which a second transmitter-identifying code different from said first transmitter-identifying code is incorporated, each of said transmission cycles comprising further information including an encoded beginning signal, an encoded data, and an encoded ending signal, said first and second transmitter-identifying codes being identifiable by said decoder, said transmitter-identifying code and said further information of said first transmitter and of said second transmitter being modulated and transmitted with a like carrier frequency $f_c$, said transmission of said first transmitter and said second transmitter being periodical groups of transmission cycles, each group having a period $T_p$, each period $T_p$ being equal to a plurality of equal intervals of duration T, which is no shorter than T1, each said period of duration $T_p$ comprising a plurality of blank intervals T in which no said transmission cycle is present and a plurality of occupied intervals in which a single transmission cycle is present, the information from said first and said second transmitters being only transmitted in the time span of said transmission cycle in said transmission of said first and said second transmitters, said information of said first transmitter in a transmission cycle $P_a$ is only taken as valid and sent to said first player system when the span of one said transmission cycle $P_a$ is not overlapped by the span of any transmission cycle of the transmission of said second transmitter, said information of said second transmitter in a transmission cycle $P_b$ is only taken as valid and sent to said second player system when the span of one said transmission cycle $P_b$ is not overlapped by the span of any transmission cycle of the transmission of said first transmitter, the distribution of the transmission cycles $P_a$ in the transmission of said first transmitter and the distribution of the transmission cycles $P_b$ in the transmission of said second transmitter being such that in each period of said first transmitter there always exists at least a transmission cycle $P_a$ of which the span is not overlapped by the span of any transmission cycle $P_b$ of the transmission of said second transmitter, and in each period of said second transmitter there always exists at least one transmission cycle $P_b$ of said transmission of said second transmitter of which the span is not overlapped by the span of any transmission cycle $P_a$ of the transmission of said first transmitter, regardless of the beginning point of said period of said first transmitter and the beginning point of said period of said second transmitter, characterized by that a period $T_p$ of the transmission of both said first and said second player systems respectively have four occupied intervals in each of which is a transmission cycle is present, and four blank intervals, wherein a period of said first player system has two groups of two consecutive said occupied intervals and two groups of two consecutive said blank intervals, while a period of said second player system comprises four consecutive occupied intervals and four consecutive blank groups, wherein said video game system is remotely controlled by the steps of transmitting said signals,
receiving said transmitted signals,
decoding said transmitted signals, and using said decoded signals to control a video game.

2. A method according to claim 1, wherein each said occupied interval T comprises a first part of duration T1 corresponding to a transmission cycle and a second part T2 in which nothing is transmitted.

* * * * *